United States Patent [19]

Dangel et al.

[11]  4,068,047
[45]  Jan. 10, 1978

[54] FLAT-PACK BATTERY SEPARATOR

[75] Inventors: Phoenix Nathan Dangel, West Roxbury; Preston Fairfax Marshall, Walpole, both of Mass.

[73] Assignee: The Kendall Company, Boston, Mass.

[21] Appl. No.: 749,567

[22] Filed: Dec. 10, 1976

[51] Int. Cl.² .............................................. H01M 2/18
[52] U.S. Cl. .................................... 429/142; 156/309; 429/152
[58] Field of Search ........................ 429/142, 152, 162

[56] References Cited

U.S. PATENT DOCUMENTS

| 1,386,650 | 8/1921 | Norris | 429/142 |
|---|---|---|---|
| 2,858,352 | 10/1958 | Solomon | 429/142 |
| 3,969,561 | 7/1976 | Marshall | 428/167 |
| 4,016,319 | 4/1977 | Marshall | 428/113 |

FOREIGN PATENT DOCUMENTS 454,041   9/1936   United Kingdom ................ 429/142

Primary Examiner—Donald L. Walton
Attorney, Agent, or Firm—Edward J. Scahill, Jr.

[57] ABSTRACT

A novel battery separator for a flat-pack or planar battery is disclosed wherein a nonwoven fabric is disposed on and across a plastic frame or grid, the outer edges of the fabric being disposed on said plastic frame are of extremely low fiber density and being oriented predominantly in a direction normal to each side of the frames so as to facilitate the more complete thermal pressurized bonding of a stack of separators and similarly electrodes by a sealing of the outer edges of the respective plastic frames. A more complete seal is thus formed insuring against the leaking or escaping of the liquid electrolyte contained therein.

8 Claims, 7 Drawing Figures

FLAT-PACK BATTERY SEPARATOR

BACKGROUND OF THE INVENTION

This invention relates to planar battery separators, flat-pack batteries and the methods of making same. More particularly, this invention concerns a planar battery separator comprising a nonwoven fabric disposed on and across an open hot melt plastic grid and wherein the portion of the fabric on the plastic grid is of a very low fiber density, facilitating a strong intra-battery seal thus prohibiting electrolyte leakage therefrom.

Planar or flat-pack batteries, for example, the LeClanche type battery, having recently become more widely used because of the "mini" product and package market in existence today. Planar batteries have found their way into computers, calculators, film-packs for instant cameras, and the like, and have received widespread acceptance. However, they seem to suffer some major drawbacks. For example, their shelf life is rather short due to electrolyte leakage therein during storage and use. This disadvantage is due primarily to faulty and incomplete seals within the battery pack. Unless the battery seal is complete, it results in many failures and much frustration.

Prior art attempts to correct this deficiency have included U.S. Pat. Nos. 3,701,690; 3,784,414; and 3,899,355. The first patent mentioned, U.S. Pat. No. 3,701,690 describes a battery having a sealant impregnated into the separator; U.S. Pat. No. 3,784,414 discloses a battery sealant carrier having adhesive patches impregnated therein; and U.S. Pat. No. 3,899,355 discloses a battery assembly utilizing a particular adhesive mass. However, none of these adequately solves the problem, and none describe or claim the invention disclosed herein.

SUMMARY OF THE INVENTION

A sheet of open-windowed hot-melt adhesive plastic defines a plurality of battery separators wherein the open windows have a web of nonwoven fibers disposed thereon which continues from one window portion to the next, however, that portion of the web crossing over the plastic areas between openings advantageously has an extremely low fiber density and those fibers are oriented substantially normal to the axis of a particular side of the opening. Because of this advantageous structure, individual battery separator can be bonded to similarly made electrodes using a plastic material therein and other separators in a rather easy and efficient manner and yet produce a more complete seal to the battery pack itself.

An object of this invention is to provide a nonwoven battery separator that is disposed in registration with a plastic frame there around that can be thermally sealed to other separators disposed on similar plastic frames and electrodes alternatingly disposed therein.

Another object of this invention is to provide a method of producing the nonwoven web in registration with the plastic frame in one operation.

Still another object of the instant invention is to provide a battery separator, wherein the nonwoven web constitutes the body of the separator, with a periphery of low fiber density areas disposed on the plastic frame that are oriented normal to the axis of the frame so as to facilitate a more complete bond of plastic to plastic.

Finally, it is also an object of the present invention to produce a battery assembly utilizing the nonwoven battery separator of this invention, that significantly reduces costs heretofore required in flat-pack batteries.

DESCRIPTION OF THE PREFERRED EMBODIMENTS

Figure 1:
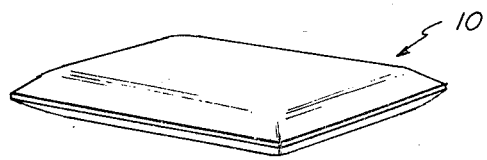
FIG. 1 shows a perspective view of a flat-pack or planar battery assembly ready to be insulated with an overwrap.

Referring to FIG. 1, there is shown a flat-pack or planar battery 10 comprising a plurality of anodes and cathodes separated by nonwoven battery separators of this invention. All four sides of the assembly are bound with a thermal pressure binding technique to produce the planar battery assembly 10.

Figure 3:
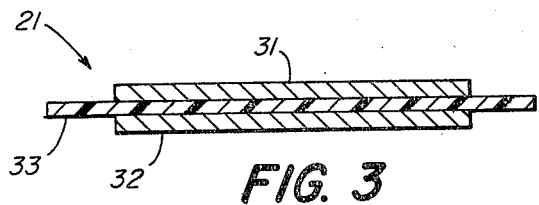
FIG. 3 is a sectional view of a typical bimetal electrode that can be used in the battery shown in FIGS. 1 and 2.
Figure 2:
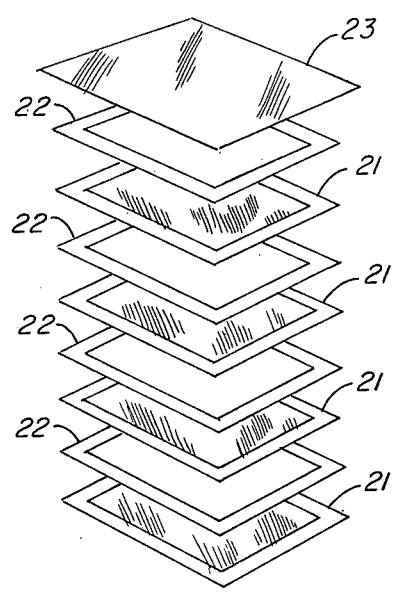
FIG. 2 is a perspective view of the stacked battery assembly of FIG. 1 prior to binding and sealing the individual components thereof together.

FIG. 2 shows an alternating stack of electrodes 21 and separators 22, stacked to the desired height depending on the voltage to be attained therewith. FIG. 3 shows a typical electrode 21 that could be used in this battery assembly wherein the anode 31 is a coating of manganese dioxide and the cathode 32 is a coating of zinc. The anode 31 and cathode 32 are coated on a conductive sheet 33 of hot melt plastic, or the like, that is impregnated with a conductive material, such as carbon. In this manner, as shown in FIG. 2, the battery assembly consists of a battery separator 22 on an electrode 21, as described above, separated by a second separator 22 on another electrode 21, and so on providing a stack of four separators and three duplex electrodes alternately disposed therein and two electrode end plates. A slightly oversized steel top sheet 23 provides the negative end of the battery and wraps around to the bottom of the assembly so that the negative and positive contacts are on the same side. The battery is then insulated with an overwrap, or the like. A stacked battery as described above would be a 6-volt battery; of course, the voltage of same could be increased or decreased accordingly, by adding or subtracting electrodes and separators. Such a 6-volt battery would be less than 0.15 inch thick and would measure about 3½ inches long by about 2¾ inches wide. Thus, it has many applications in the mini-electronic market.

Figure 4:
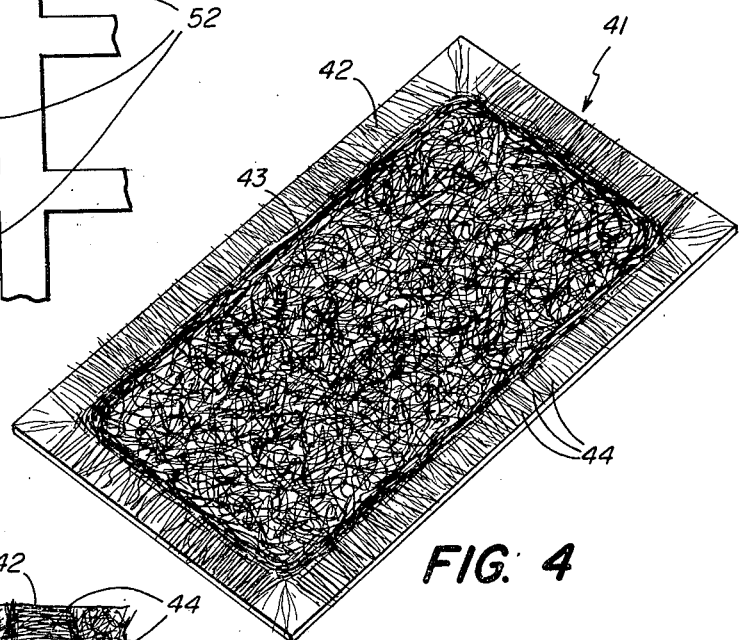
FIG. 4 shows a perspective view of the battery separator described in the present invention.
Figure 6:
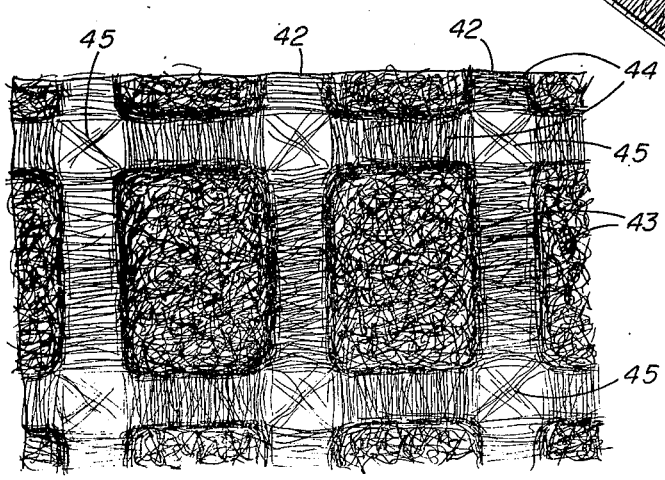
FIG. 6 is a partial view of a nonwoven web disposed over and on the plastic grid of FIG. 5.

The prior art problems stemming from the leakage of the liquid electrolyte through the sealant impregnated edges is overcome herein by the use of a battery separator such as described and shown in FIG. 4. The battery separator 41 comprises a generally rectangular plastic frame 42 of a material such as Versalon 1117, a trademark for a low viscosity hot melt thermoplastic sheet of a polyamide resin material sold by General Mills Chemicals, Inc., of Minneapolis, Minn. Within the frame or grid 42, is disposed the nonwoven separator material 43 which consists of randomly disposed textile fibers. The edges of the separator material 43 that lie directly adjacent the plastic grid are substantially oriented in a direction that runs parallel to the contours of the grid. However, the fibers 44 of the separator material 43 that bridge onto and over the grid 42 are of extremely low fiber density and are oriented substantially in a direction normal to the axis of the respective sides of the grid. This construction of the separator 41 facilitates the leakproof binding of the components of the battery, while providing a battery of sufficient strength and thickness to achieve its purpose.

Figure 5:
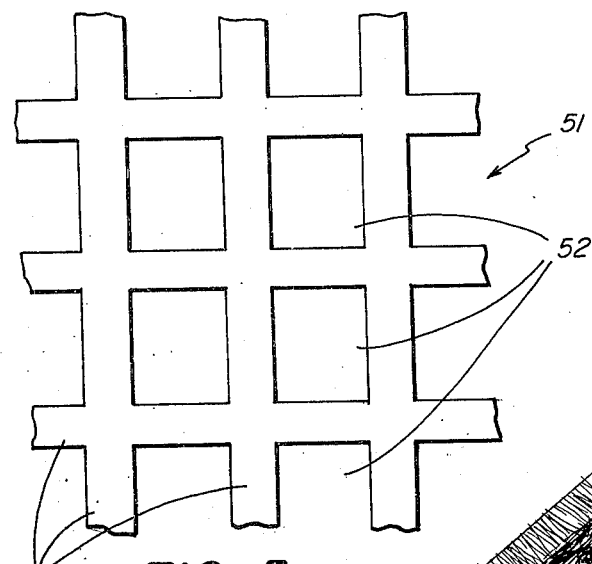
FIG. 5 is a partial view of a plastic grid used to make the battery separator described herein.

This advantageous battery separator 41 can be made in much the same manner as described in U.S. Pat. No. 3,969,561, of common assignee, wherein a biaxially oriented nonwoven fabric is produced. FIG. 5 shows a sheet of Versalon 1117, or the like, that has been made into a grid structure 51, having equal rectangular openings 52 cut therein so as to leave these openings 52 surrounded by plastic connecting frame elements 53. A continuous sheet of the plastic grid 51 is then disposed on a continuously moving and porous conveyor screen, such as described in U.S. Pat. No. 3,969,561. A suction means placed under the screen and grid cause a majority of the fibers in a fluid-borne stream of textile-length fibers, preferably containing a rather high proportion of thermoplastic fibers, to locate within the openings, as at 43, while simultaneously causing a small number or minority of fibers to bridge across the plastic frame elements at 44, being pulled by the suction on either side thereof. Generally, over 80% of the fibers in the fluid-borne stream locate within the openings in the grid. Thus, the bridging fibers 44 are oriented in the direction substantially normal to the axis of the frame element 42, while the fibers within said opening that are directly adjacent the grid are oriented in the direction substantially parallel to the axis of the grid. The remaining fibers within the opening are in substantial random orientation. At the interstices 45 of the frame elements the fibers are drawn by suction from four open areas and result in fibers oriented at an angle of about 45° to the axis of the adjacent low fiber density areas 44. The sheet of thusly formed separators then passes through or under a heating means, such as infra-red lights, so as to anchor the separators in place on the grid. The sheet of separators can be assembled in a number of ways. For example, sheets of electrodes as described in FIG. 3 can be alternately stacked with the sheets of separators to the desired height or voltage value. These stacked sheets can then be die cut, with heat and pressure, so as to form finished battery assemblies.

In another embodiment, the sheets of battery separators, anchored into registration with the plastic grids, having the anodes and cathodes disposed to the top and bottom thereof separated by the nonwoven, electrolyte saturated, material. These cells are then stacked, cut and bound together as described above.

Figure 7:
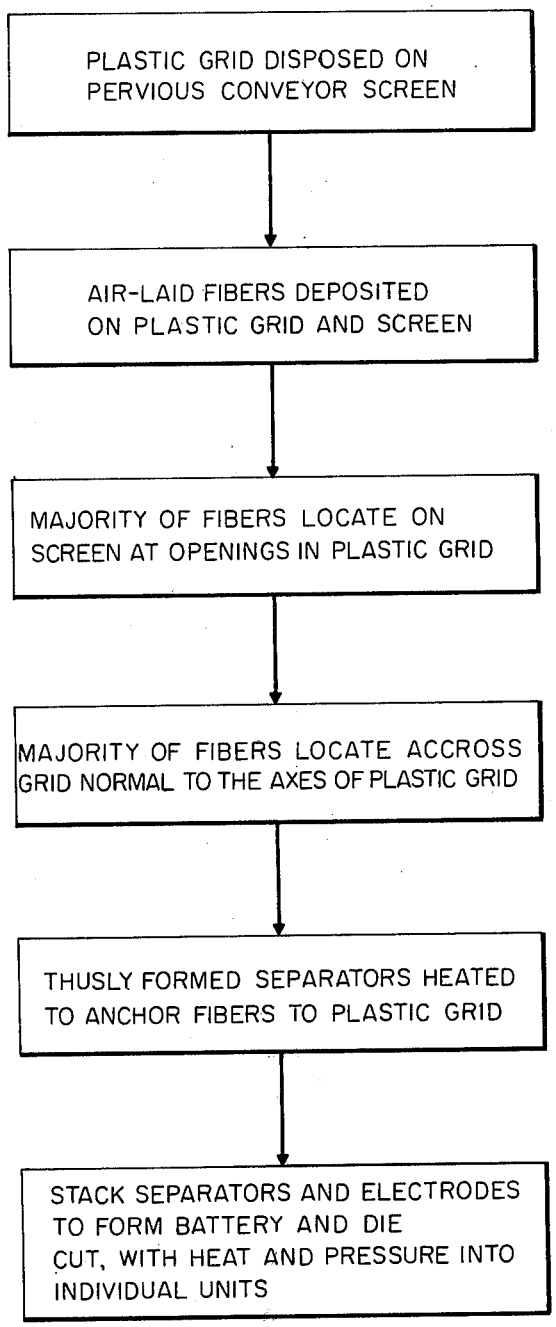
FIG. 7 is a flow chart outlining the method of making the battery separator of this invention.

FIG. 7 shows a flow chart outlining the method of making the separators and battery of this invention.

EXAMPLE 1

A typical example of the preferred embodiment of this invention comprises depositing a fluid-borne stream of a 50–50 blend of 5.5 denier ¼ inch cut Vinyon fibers (a trade name for fibers of a polymer of vinyl acetate and vinyl chloride made by American Viscose) and 2.5 denier Creslan fibers (a trade name for an acrylic fiber made by American Cyanamid Company), onto a plastic grid disposed on a moving conveyor screen, said screen having a suction means disposed thereunder for aiding and assisting the advantageous disposition of the fibers onto the grid and being essentially as described in U.S. Pat. No. 3,969,561. The weight of such a formed fabric is approximately 50 grams/square yard. The grid may be of any flexible, thin, thermoplastic material such as versalon 1117, or the like. A majority of the fibers are located on the openings in the grid. The separator was heated in a hot-air oven at a temperature of 370° F. Since the area of nonwoven therein is about 7.5 square inches (approximately 3 × 2½ inches), and the total weight of the fabric disposed on the grid is 50 grams/square yard, then each nonwoven separator will weigh approximately 0.29 grams/unit, and at 7.5 square inches/pad there are approximately 172 pads/square yard. The thusly formed separators were passed through a heating means at about 370° F for anchoring the nonwoven and plastic together, and are ready for subsequent use in the assembly of flat-pack batteries.

EXAMPLE 2

Another battery separator was made of a 25–75 blend of Vinyon and Orlon fibers (a trademark for an acrylic fiber made by E. I. duPont de Nemours and Company of Wilmington, Del.), wherein a separator material was made in the same manner as described in Example 1 and weighing 56 grams per square yard. The separator was made of 42 grams/square yard of 1½ inch 1.5 denier Orlon fibers and 14 grams/square yard of 3 denier ¼ inch cut Vinyon fibers and were heated in a hot-air oven at a temperature of 370° F. Again, since the area of nonwoven therein is about 7.5 square inches, there are approxiately 172 pads/square yard.

Because of the extremely low fiber density of the fabric across the grid portion of the separators, it is therefore not necessary to use a hot melt plastic material of a very high thickness. Separators made according to this invention can thus be securely made with integrity at a very low cost. Thus, it is possible to reduce the thickness and cost of the planar battery, while substantialy eliminating the leakage problem of prior art batteries.

Of course, the fibers in the nonwoven material used as the separator herein can be of any composition so long as at least 10% of thermoplastic fibers are present in the fiber blend so as to facilitate the bonding of the separators to each other and to the electrodes of the battery.

Since it is obvious that many modifications and embodiments can be made in the above-described invention without changing the spirit and scope of the invention, it is intended that this invention not be limited by anything other than the appended claims.

What is claimed is:

1. A battery separator for planar batteries comprising:
   a generally rectangular supporting grid of a hot melt material, said grid having a generally rectangular opening therein;
   a nonwoven fabric disposed across said grid and said opening, a majority of the fibers in said fabric are located within said opening, said fibers disposed therein that are directly adjacent said grid are oriented in a direction substantially parallel to said axis of said adjacent grid, the remaining fibers in said opening are in substantially random orientation, a minority of said fibers in said fabric being disposed on said grid and being oriented thereon in a direction substantially normal to the axis of said grid.

2. The battery separator of claim 1 wherein over 80% of the fibers in said nonwoven fabric are located within said openings.

3. The battery separator of claim 1 wherein said nonwoven fabric consists of a blend of thermoplastic and non-thermoplastic fibers, said thermoplastic fibers comprising at least 10% of the total fabric weight.

4. The battery separator of claim 1 wherein said nonwoven fabric consists of a 50%-50% blend of fibers of a polymer of vinyl acetate and vinyl chloride and acrylic fibers.

5. In a planar battery having, in staked relationship, a planar anode, a planar cathode, a planar separator disposed between said anode and cathode, a liquid electrolyte in contact with said anode, cathode and separator, the improvement comprising a planar separator comprising a generally rectangular supporting grid of a hot melt material, said grid having a generally rectangular opening therein; a nonwoven fabric disposed across said grid and said opening, a majority of the fibers in said fabric are located within said opening, said fibers disposed therein that are directly adjacent said grid are oriented in a direction substantially parallel to said axis of said grid, the remaining fibers in said opening are in substantially random orientation, a minority of said fibers in said fabric being disposed on said grid and being oriented thereon in a direction substantially normal to the axis of said grid.

6. The battery of claim 5 wherein over 80% of the fibers in said nonwoven fabric are located within said openings.

7. The battery of claim 5 wherein said nonwoven fabric consists of a blend of thermoplastic and non-thermoplastic fibers, said thermoplastic fibers comprising at least 10% of the total fabric weight.

8. The battery of claim 5 wherein said nonwoven fabric consists of 50%-50% blend of fibers of a polymer of vinyl acetate and vinyl chloride and acrylic fibers.

* * * * *